United States Patent [19]

Stiles et al.

[11] 4,261,643

[45] Apr. 14, 1981

[54] METHOD AND APPARATUS FOR JOINING THE ENDS OF TWO FIBER OPTIC CABLES

[75] Inventors: Kenneth M. Stiles, San Dimas; Charles H. Smith, Glendale, both of Calif.

[73] Assignee: Sea-Log Corporation, Pasadena, Calif.

[21] Appl. No.: 9,067

[22] Filed: Feb. 5, 1979

[51] Int. Cl.³ .................... G02B 5/16; H01R 4/00
[52] U.S. Cl. .................. 350/96.20; 24/122.6; 174/89
[58] Field of Search ............. 350/96.20, 96.21, 96.22; 174/79, 89; 24/122.3, 122.6

[56] References Cited

U.S. PATENT DOCUMENTS

| 3,324,517 | 6/1967 | Glowacz | 174/89 |
|---|---|---|---|
| 3,871,744 | 3/1975 | Bridger et al. | 350/96.21 |
| 3,923,371 | 12/1975 | Dalgleish | 350/96.21 |
| 3,966,299 | 6/1976 | Osterfield et al. | 350/96.21 |
| 4,026,633 | 5/1977 | Crick | 350/96.21 |
| 4,047,797 | 9/1977 | Arnold et al. | 350/96.21 |
| 4,168,109 | 9/1979 | Dumire | 350/96.20 |

Primary Examiner—Stewart J. Levy
Attorney, Agent, or Firm—Christie, Parker & Hale

[57] ABSTRACT

A connector for interconnecting the ends of two optical fiber cables to provide accurate alignment of the optical fibers free of stress from the mechanical linkage of the respective cables. The sheath at the adjoining end of each cable is split in two and separated to expose the optical fiber. The split ends of the sheath are inserted in separate diverging holes in a mounting ferrule while the exposed optical fiber is inserted in a central bore between the diverging holes. The sheath ends are anchored by cementing the ends in the holes. Only the very outer end of the exposed optical fiber is anchored by cement in the ferrule to fix the alignment of the fiber. The rest of the exposed fiber between the anchored outer end and the point at which the sheath is split is bowed slightly to relieve any tension on the fiber. The ends of the cables are joined by mounting the ferrules in a common connector body with the outer ends of the fibers held in abutting axial alignment.

10 Claims, 4 Drawing Figures

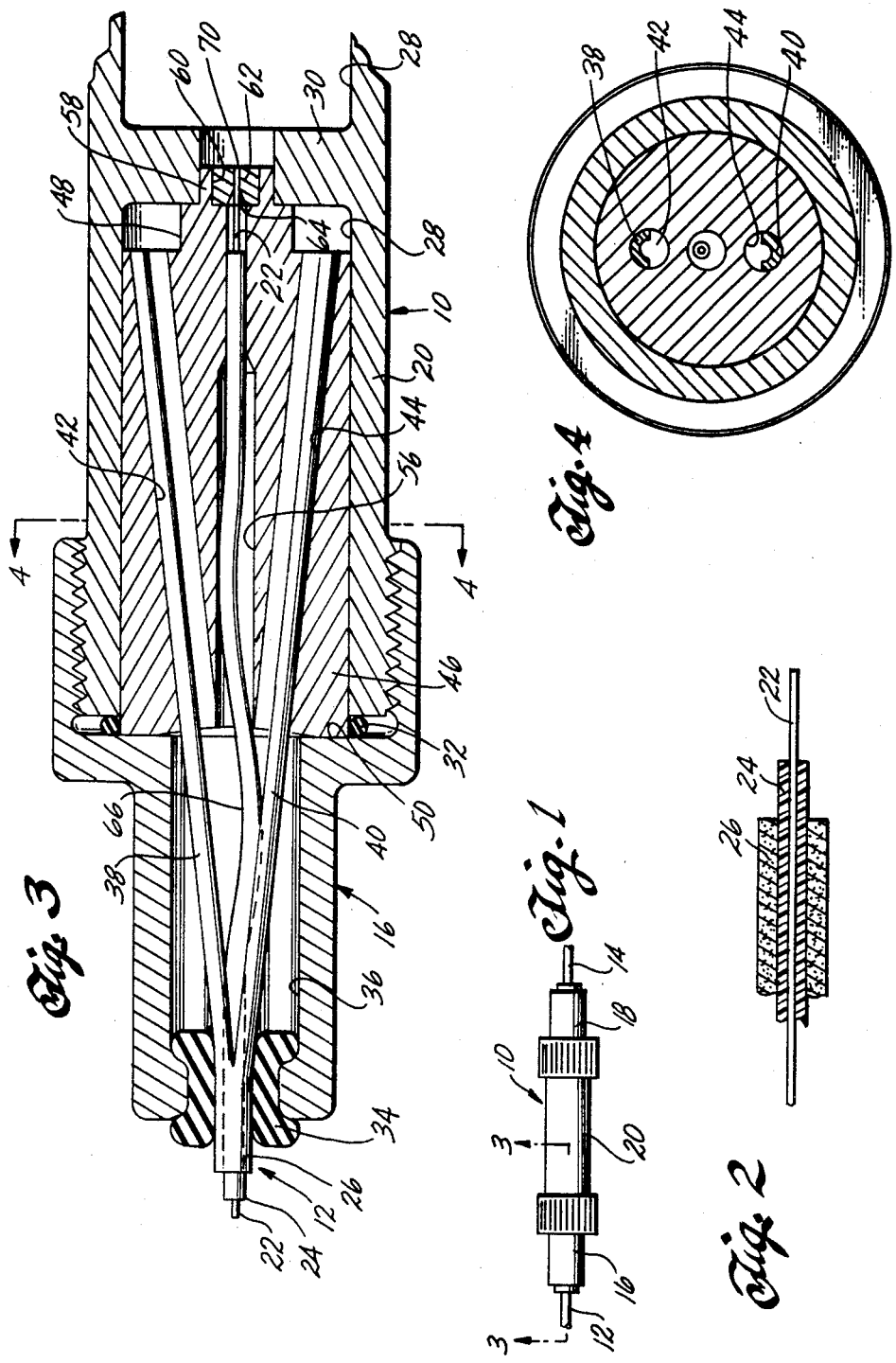

4,261,643

METHOD AND APPARATUS FOR JOINING THE ENDS OF TWO FIBER OPTIC CABLES

FIELD OF THE INVENTION

This invention relates to optical fiber transmission cables, and more particularly, to a connector assembly for joining the ends of two optical fiber cable sections.

BACKGROUND OF THE INVENTION

Connectors for optical fiber cables present unique problems in providing strong mechanical junctions between the cable ends while isolating the optical fiber strands from external loads which stress or break the strands. At the same time the connector must maintain the strands of the adjoining cables in accurately aligned optically efficient junctions. Numerous designs for constructing optical fiber cable connectors have heretofore been proposed. For example, one such connector is described in U.S. Pat. No. 3,871,744. The connector disclosed in this patent anchors the outer sheath of the cable by inserting the end of the cable, including the sheath, in a central bore in the rear of the connector and anchoring the sheath by a suitable adhesive. The fiber optic strand is in turn cemented in a sleeve which is mounted in the front of the connector and the fiber is bowed between the end of the sheath and the point where the fiber strand is anchored. Since the fiber strand is bowed after the connector is assembled but before the optical fiber is cemented in place in the sleeve, an external screw is required to provide a lateral force to the optical fiber strand from outside the connector body.

SUMMARY OF THE INVENTION

The present invention is directed to an improved optical fiber connector which can be readily assembled and disassembled, yet provides a strong mechanical junction between the ends of two optical fiber cables. Securing the cable to the connector is simplified yet provides for accurate alignment of the optical fiber strands while isolating the strands from stress and from external loads on the cable. The fiber strands can be stress relieved prior to the assembly of the connector, eliminating the need for an external screw of other means for bowing the strand from outside the assembled connector.

This is accomplished, in brief, by providing a connector assembly including a tubular shaped connector body into which cylindrical ferrules are slidably inserted from each end and seated against opposite sides of a shoulder in the connector body. The ferrules are anchored in place by removable end caps threadedly engaging the connector body. The fiber optic cables enter the connector through end caps and are anchored in the ferrules. Each ferrule has at least three longitudinal bores extending lengthwise through the ferrule, namely, a central bore along the axis, and at least two slanted bores positioned at least on either side of the central bore which converge on the central bore at the end of the ferrule. The end of the cable is anchored in the ferrule by splitting the outer sheath to expose the optical fiber strand. Two split sections of the sheath are inserted respectively in the slanted bores and the optical fiber strand is inserted in the central bore. The split sections are cemented in the slanted bores. The optical fiber is then bowed slightly by displacing the optical fiber laterally relative to the axis of the central bore and the bowed optical fiber strand is then cemented at the end where it emerges from the central bore. After the emerging ends are polished off flush with the ends of the ferrules, the emerging ends of the strands are held in aligned abutting relationship by clamping the ferrules against the shoulder in the connector body.

DESCRIPTION OF THE DRAWINGS

For a more complete understanding of the invention reference should be made to the accompanying drawings, wherein:

FIG. 1 is a side view of an assembled connector;

FIG. 2 is a detailed sectional view of an optical fiber cable;

FIG. 3 is a longitudinal sectional view taken substantially on the line 3—3 of FIG. 1; and FIG. 4 is a cross-sectional view taken substantially on the line 4—4 of FIG. 3.

DETAILED DESCRIPTION

Referring to FIG. 1, there is shown a connector assembly 10 for interconnecting the ends of two optical fiber cables 12 and 14. The cables are axially aligned and enter the connector 10 through a pair of removable end caps 16 and 18 which threadedly engage a central connector body 20. The cables 12 and 14 are preferably of a type described in U.S. Pat. No. 4,133,349, issued Sept. 12, 1978, to Kenneth M. Stiles, incorporated herein by reference. As shown in FIG. 2, the cable includes an optical fiber 22 with a coating 24 of an elastomer material, such as silicone rubber. Surrounding the coating 24 is a fiber reinforced resin outer shell or sheath 26. The outer sheath 26 provides tensile strength for the cable as well as protecting the coated optical fiber.

Referring to FIGS. 3 and 4, the connector assembly 10 is shown in more detail. The connector body 20 is of generally tubular construction with a cylindrical central bore 28 of uniform diameter except for a shoulder portion 30 at the center of the bore. The outer ends of the connector body 20 are threaded to receive the end caps 16 and 18. O-rings 32 are provided to seal the interfaces between each end cap and the connector body.

The cable 12 passes into the connector through a grommet 34 seated in an opening in the closed end of the end cap 16. The end cap 16 has a central bore 36 which is of substantially larger diameter than the cable.

The outer sheath 26 of the cable 12 is split, as shown, into two sections 38 and 40 at a point inside the end cap. The split sections of the sheath are inserted into a pair of slanted holes 42 and 44 in an anchoring member or ferrule 46. The ferrule 46 is cylindrical in shape and slidably engages the bore 28 in the connector body 20. The front end of the ferrule has a reduced diameter portion 48 which is of slightly larger diameter than the opening through the shoulder 30 so that the larger diameter portion 48 engages the shoulder 30 to position the ferrule axially within the bore 28. The end cap 16 has an end surface 50 which engages the rear end of the ferrule 46 for clamping the ferrule securely in the bore 28. The split ends 38 and 40 of the sheath are cemented in the holes 42 and 44 in the ferrule 46 by an epoxy cement, or the like, so as to securely anchor the sheath of the cable to the connector assembly. Thus any tension in the cable due to external loads is transferred directly through the sheath to the connector body.

The optical fiber with its outer coating 24 is exposed by the splitting of the outer sheath, allowing the coated optical fiber to be inserted in a central hole 56 extending between the slanted holes 42 and 44 along the axis of the cylindrical ferrule 46. The central opening 56 is substantially larger in diameter than the coated fiber over approximately two-thirds of its length extending from the rear end of the ferrule 46. The hole 56 then narrows down to a smaller diameter which is only slightly larger than the diameter of the coating on the optical fiber.

The front end of the ferrule includes an end portion 58 of slightly smaller diameter than the opening in the shoulder 30. The end portion 58 is countersunk, as indicated at 60, to receive a jewel member 62. The jewel has a tapered opening 64 through which the optical fiber 22 passes. The tapered opening 64 provides accurate radial positioning of the optical fiber 22.

After the uncoated end of the optical fiber 22 is inserted in the opening 64 in the jewel 62, the coated portion of the optical fiber in the region between the rear of the ferrule 46 and the point where the outer sheath is split is bowed or deflected laterally, as indicated at 66. The optical fiber 22 is then cemented in the opening 64 to anchor the optical fiber in place in its slightly bowed state. The end of the optical fiber 22 is then polished to make it smooth and flat and co-planar with the outer end face of the jewel 62.

The cable 14 is similarly anchored in a ferrule (not shown) which is inserted in the connector body 20 from the other end so as to be in engagement with the opposite side of the shoulder 30 from the ferrule 46. When so positioned, the jewels 62 in the respective ferrules are brought into abutting relationship while holding the optical fibers 22 of the respective cables in aligned relationship for efficient transfer of light energy between the optical fibers of the two cables.

The assembly procedure for the connector is as follows. The cable 12 is inserted through the grommet 34. The end cap is then moved down the cable away from the end sufficiently to be out of the way during the initial assembly. Several inches of the optical fiber are then exposed by removing the outer sheath 26 and elastomer coating 24. The outer sheath is then split at the end a predetermined distance slightly less than half the length of the assembled connector. The two slant holes 42 and 44 are then filled with an epoxy cement. The cable is then attached to the ferrule by inserting the respective halves of the split sheath into the two slant holes while inserting the optical fiber into the central hole in the ferrule 46. The halves of the sheath are pushed into the slant holes a sufficient distance for the ends to appear at the opposite end of the ferrule. The exposed end of the optical fiber will extend through the hole in the jewel and beyond.

After the epoxy cement has cured in the slant holes so as to anchor the sheath in the ferrule, the exposed portion of the coated optical fiber to the rear of the ferrule 46 is deflected against one of the split halves of the sheath by manually pressing against the coated fiber. This deflection or bowing of the coated fiber causes the exposed end of the optical fiber to be drawn back slightly relative to the jewel. While thus held in the deflected condition, the exposed end of the optical fiber is broken off at the face of the jewel and an epoxy cement is applied around the exposed end of the optical fiber where it emerges from the jewel, as indicated at 70. After the epoxy has cured, the exposed end of the optical fiber is polished smooth and flush with the outer face of the jewel 62. The ferrule with the cable attached is then inserted in one end of the connector body 20, the O-ring is put in place at the outer end of the connector body around the ferrule, and the end cap is then threaded in position to securely clamp the ferrule in position against the shoulder 30. The same procedure is repeated for the cable 14 to complete the connector assembly.

An alternative arrangement for aligning the optical fibers is described in copending application Ser. No. 826,523, filed Aug. 22, 1977, now U.S. Pat. No. 4,167,304, entitled "Method and Apparatus for Providing Perfect Alignment of Optical Fibers Contained in Connectors", in the name of Arthur W. Gelbke and assigned to the same assignee as the present application and incorporated herein by reference. By using the aligning arrangement shown in the above-identified copending application, the jewel 62 can be eliminated and the optical fiber 22 cemented in the outer end of the hole 56. Eccentricity between the fiber and the end portion 58 of the ferrule 46 is assured by machining the outer cylindrical surface of the end portion 58 after the fiber is cemented in place in the ferrule, in the manner described in detail in the above-identified copending application. Thus when the end portion 58 is inserted into the opening through the shoulder 30, the optical fiber is perfectly centered in the connector. The outer surface of the ferrule 46 in such case is made sufficiently undersize to accommodate any eccentricity between the machined outer surface of the end portion 58 and the outer cylindrical surface of the ferrule 46, so that the ferrule can be freely inserted into the connector body.

From the above description it will be seen that a connector assembly is provided which transfers external loads on the cables through the sheath to the connector body and to the sheath of the outer cable. The optical fiber strands of the two cables are relieved of all stress due to external loads by virtue of the slack which is maintained in the optical fibers by the lateral deflection or bowing of the fiber between the point where it emerges from the sheath and the point where it is anchored at the jewel. The connector can be readily disassembled by unscrewing the end caps and withdrawing the ferrules.

While the invention has been illustrated in terms of splitting the sheath into two halves, more than two slant holes may be provided in ferrule 46 and enough splits in the sheath provided to accommodate the number of slant holes provided about the central bore 56.

What is claimed is:

1. A connector for an optical fiber cable of a type having an optical fiber inside a flexible sheath, comprising: a ferrule having a central bore and at least two slant bores concentrically about and converging toward the central bore at one end of the ferrule, the central bore being substantially larger in diameter than the optical fiber at said one end of the ferrule and terminating adjacent the other end of the ferrule in a section of reduced diameter, the sheath being split into segments forming split ends corresponding to the number of slant bores at one end of the cable, the split ends inserted respectively in the slant bores, means anchoring the split ends in the respective slant bores, and means anchoring the optical fiber in the reduced diameter section of the central bore with the optical fiber bowed within the larger diameter end of the central bore and within the length of the split ends whereby any external loads on the optical fiber cable are transferred to the ferrule through the split ends anchored in the slant bores while the bowed optical fiber remains isolated from such external loads.

2. The connector of claim 1 further including a connector body having passage for receiving the ferrule, and a cap having an opening and removably secured to the connector body at one end of said passage for clamping the ferrule in said passage in the connector body, the cable passing through the opening in the cap.

3. The connector of claim 2 wherein the point at which the sheath splits is within the cap.

4. A connector assembly for an optical fiber cable of a type having a coated optical fiber inside a flexible sheath, comprising: a connector body having a central passage, a shoulder in the passage, first and second ferrules inserted in the passage from opposite ends into engagement with the shoulder, the ferrules having central bores each of a diameter sufficient to receive the optical fiber in bowed relation and terminating in a section of reduced diameter, held in axial alignment by the connector body and containing at least two slanted bores concentrically about and converging toward the central bores at the ends of the ferrules away from said shoulder, each of the cables having the sheath split at the end of the cable into segments forming split ends to expose a portion of the ends of the optical fiber of the cable, the split ends of the cables being separated and inserted in the provided slant holes of the respective ferrules, the exposed end of the optical fiber extending along the length of the split ends and the central bore in bowed relation, the fibers of the two cables being held in abutting axial alignment each anchored in the respective sections of reduced diameter at the adjacent ends of the ferrules, means anchoring the split ends of the respective sheaths in the slant holes of the ferrules, whereby any tensile load on the cables is transferred through the split ends of the respective sheaths to the ferrules without being transferred to the bowed optical fibers, and removable end caps secured to the connector body at the respective ends of the passage to lock the ferrules in place against the shoulder, the caps each having an opening through which the cables pass into the connector body.

5. The connector of claim 4 further including cementing means anchoring the ends of the optical fibers in said sections of reduced diameter and the split ends in the slanted bores.

6. The connector of claim 5 wherein said sections of reduced diameter of the central bores of the ferrules comprise a pair of jewel members mounted respectively in the adjacent ends of the ferrules, the jewel members being in abutting relationship, each jewel having a hole for receiving the exposed end of one of the optical fibers.

7. A method of anchoring the end of an optical fiber cable having an optical fiber and a surrounding tension-resistant sheath, comprising the steps of: splitting the sheath into at least two segments forming split ends adjacent one end of the cable to expose the optical fiber, inserting the split ends of the sheath in slanted bores located concentrically about a central bore formed in a ferrule and the exposed ends of the optical fiber in the central bore adapted at one end over a portion of the bore length to receive an exposed outer end of the optical fiber in close slidable relation and being larger in diameter over the balance of bore length to enable bowing of the optical fiber therein, cementing the split ends of the sheath in the slanted bores, laterally displacing the optical fiber from a straight line path in the central bore into a bowed condition over said balance of the bore length and to the point where the sheath is split, and cementing the outer end of the bowed optical fiber at the end of the central bore opposite the point where the sheath is split to maintain the optical fiber under slight compression to maintain the bowed condition whereby in use the tensile loads are transferred to the split ends in the slanted bores and not to the bowed optical fibers.

8. The method of claim 7 further comprising the steps of: inserting the ferrule in a connector body, and securing the ferrule in place in the connector body.

9. The method of claim 7 further comprising the steps of: securing two of said ferrules together with the associated optical fiber ends in axially aligned abutting relationship.

10. A connector for an optical fiber cable of a type having an optical fiber inside a flexible sheath, comprising: a connector body having a tubular passage with a shoulder extending into the passage intermediate the ends thereof, the shoulder forming a reduced diameter opening, a pair of ferrules each having a central bore and at least two slant bores concentrically about the central bore and converging toward the central bore at one end of the ferrule, the central bore being substantially larger in diameter than the optical fiber at said one end of the ferrule in a section of reduced diameter, the ferrules being removably positioned in the tubular passage of the connector body from either end with the reduced diameter portions extending into said reduced diameter opening, and a pair of end caps removably attached to the connector body at either end of said passage, the end caps clamping the reduced diameter ends of the ferrules together in said reduced diameter opening, the end caps having axially aligned openings for receiving the ends of two optical fiber cables to be connected, the central bore of each ferrule at said one end substantially larger in diameter than the optical fiber adapted to receive the optical fiber, with the sheath split into segments forming split ends and separated from the optical fiber, in bowed relation within the central bore and along the length of the split end of the separated sheath, and the provided slant bores being adapted to receive split ends of the separated sheath.

* * * * *